US010565243B2

(12) United States Patent
Reddy et al.

(10) Patent No.: US 10,565,243 B2
(45) Date of Patent: Feb. 18, 2020

(54) APPLICATION-INDEPENDENT TRANSFORMATION AND PROGRESSIVE RENDERING OF QUERIES FOR CONSTRAINED USER INPUT DEVICES AND DATA MODEL ENABLING SAME

(71) Applicant: SAP SE, Walldorf (DE)

(72) Inventors: Avinash Gopala Reddy, Cupertino, CA (US); Thomas Boulton, Canberra (AU); Ullas An, Bangalore (IN); Rupali Ray, Bangalore (IN); Sourav Dutta, Bangalore (IN)

(73) Assignee: SAP SE, Walldorf (DE)

( * ) Notice: Subject to any disclaimer, the term of this patent is extended or adjusted under 35 U.S.C. 154(b) by 224 days.

(21) Appl. No.: 15/476,761

(22) Filed: Mar. 31, 2017

(65) Prior Publication Data

US 2018/0239501 A1 Aug. 23, 2018

(30) Foreign Application Priority Data

Feb. 17, 2017 (IN) .............................. 201741005747

(51) Int. Cl.
*G06F 3/0484* (2013.01)
*G09B 7/04* (2006.01)
(Continued)

(52) U.S. Cl.
CPC ............ *G06F 16/338* (2019.01); *G06F 3/015* (2013.01); *G06F 3/04842* (2013.01);
(Continued)

(58) Field of Classification Search
None
See application file for complete search history.

(56) References Cited

U.S. PATENT DOCUMENTS

| 2006/0195354 A1* | 8/2006 | Borovoy ........... G06Q 10/06398 |
| | | 705/7.19 |
| 2006/0216685 A1* | 9/2006 | Brodie ..................... G09B 7/02 |
| | | 434/323 |

(Continued)

OTHER PUBLICATIONS

Ramaraju, Saiprasadrao, "Adobe Forms from Scratch," retrieved from https://wiki.scn.sap.com/wiki/display/ABAP/Adobe+Forms+from+Scratch, on or before Mar. 8, 2017, 13 pages.

(Continued)

*Primary Examiner* — Beau D Spratt
(74) *Attorney, Agent, or Firm* — Klarquist Sparkman, LLP

(57) ABSTRACT

A transformation platform allows a common data model to provide query output to multiple types of output devices, and incorporate query responses received using multiple types of constrained user input devices, such as neural headsets, that may be used by disabled individuals. Data and software applications can employ input and output modes of a client computer device without the data or application having to be specifically formatted or programmed for the different input and output modes. The data can specify queries that include response fields having response options that are selectively, such as progressively, highlighted. A user can provide input to select a highlighted response option. For a query having multiple response fields, response options for each response field can be progressively displayed after user input is received for a current set of response options. The query responses can be stored in the data model in association with field identifiers.

20 Claims, 9 Drawing Sheets

(51) Int. Cl.
*G06F 16/338* (2019.01)
*G06F 16/332* (2019.01)
*G06F 17/24* (2006.01)
*G06F 3/01* (2006.01)
*G06F 3/0489* (2013.01)
*G09B 21/00* (2006.01)

(52) U.S. Cl.
CPC ........ *G06F 3/04895* (2013.01); *G06F 16/332* (2019.01); *G06F 17/243* (2013.01); *G09B 7/04* (2013.01); *G09B 21/00* (2013.01)

(56) References Cited

U.S. PATENT DOCUMENTS

| | | | | |
|---|---|---|---|---|
| 2007/0010330 | A1* | 1/2007 | Cooper | A63F 9/183 463/42 |
| 2008/0215992 | A1* | 9/2008 | Or | G06F 16/95 715/753 |
| 2014/0149303 | A1* | 5/2014 | Band | G06Q 10/1057 705/322 |
| 2016/0112212 | A1* | 4/2016 | Tabrizi | H04L 12/1822 715/756 |
| 2016/0170594 | A1* | 6/2016 | Rosenberg | H04L 67/10 715/753 |
| 2017/0188933 | A1* | 7/2017 | Huggins | A61B 5/4088 |

OTHER PUBLICATIONS

Dvorsky, George, "New Brain-Link Tech Means We can Now Play 20 Questions With Our Minds," retrieved from http://io9.gizmodo.com/new-brain-link-tech-means-we-can-now-play-20-questions-1732991346, on or before Feb. 16, 2017, 6 pages.

Edelman, Laura, "4 Ways to Customize Forms in SAP Business by Design," retrieved from http://www.fmtconsultants.com/4-ways-to-customize-forms-in-sap-business-bydesign/, on or before Mar. 8, 2017, 7 pages.

"For Insight Backers: News, Updates, Helpful Information," retrieved from https://emotiv.zendesk.com/hc/en-us/articles/205694135-For-Insight-Backers-News-Updates-Helpful-Information, on or before Feb. 16, 2017, 7 pages.

Duncan, Greg, "Mouse with your mind . . . ," retrieved from https://channel9.msdn.com/coding4fun/blog/Mouse-with-your-mind, on or before Feb. 16, 2017, 5 pages.

"Software," retrieved from https://www.emotiv.com/software/, on or before Feb. 16, 2017, 2 pages.

"Training Mental Commands," retrieved from https://emotiv.zendesk.com/hc/en-us/articles/201216335-Training-Mental-Commands, on or before Feb. 16, 2017, 2 pages.

* cited by examiner

APPLICATION-INDEPENDENT TRANSFORMATION AND PROGRESSIVE RENDERING OF QUERIES FOR CONSTRAINED USER INPUT DEVICES AND DATA MODEL ENABLING SAME

CROSS REFERENCE TO RELATED APPLICATION

This application claims priority to, and incorporates by reference, India Provisional Patent Application No. 201741005747 filed Feb. 17, 2017.

FIELD

The present disclosure generally relates to a data model that allows various applications to receive user input from constrained user input devices without the applications having been specifically programmed to provide such functionality. Particular implementations allow disabled individuals to provide information to an application, such as query responses, without the assistance of another individual, using user input devices that may have limited, or constrained, input functionality.

BACKGROUND

Computer devices are ubiquitous in today's society. Despite the importance of computer devices, most computer programs are directed towards individuals of normal ability who are able to see output rendered to a display and hear output rendered to a speaker or other audio endpoint. Similarly, most general computer programs are only configured to receive input from typical input devices (e.g., keyboards and pointing devices such as a mouse, trackball, or touch screen).

Unless software is specifically directed towards disabled individuals, programs typically will have few, if any, features that make it easier for disabled individuals to interact with the software. Even if software programs provide some limited support for disabled individuals, the support is often only helpful for mildly disabled individuals. Further, providing even that level of support can require significant additional programming effort, which is why it may be forgone in many cases. If software support for disabled individuals is provided by a program, it is typically specific to that program, and cannot easily be used in a different computer program.

There have been some attempts to make computer devices generally more accessible to disabled individuals. For example, an operating system may provide features such as speech recognition, text-to-speech capabilities, visual alternatives to audio output, and screen displays enhanced to assist the visually impaired. However, it can be difficult for a general accessibility scheme to support the needs of specific computer programs. In addition, general accessibility features may be cumbersome for a user and may not be sufficient for severely disabled individuals, or individuals whose disabilities do not match the provided accessibility features.

In some cases, the lack of effective ways for disabled individuals to interact with computer programs can result in a normally-abled individual needing to assist the disabled individual to interact with a computer, or manually carrying out a task that could be implemented with a computer program. Human intervention can dramatically increase the cost of carrying out an activity, as well as the time required to carry out an activity. The cost and time needed to carry out activities with disabled individuals may result in reduced interaction with disabled individuals. In addition, because the disabled individual is not directly providing input, there is the chance for miscommunication to occur between the normally-abled individual and the disabled individual. Accordingly, there remains room for improvement in providing mechanisms for disabled individuals to interact with computer programs, or otherwise provide non-standard ways for individuals to interact with computer programs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating user interaction with a computer device. More particularly, techniques and solutions are described for facilitating the rendering of content at different types of output devices, and the receiving of user input from different types of input devices. A transformation platform can render content for a particular type of output device, and can receive user input relating to the content for a selected type of input device According to a particular method, data in a data model, the data specifying a form, is received that includes one or more queries. Each query includes query text and at least one response field. A plurality of response options are received for the at least one response field. An output type is determined, the output type specifying an output format for the one or more queries. The one or more queries are converted to the output format. The one or more queries are rendered to an output device of the output type.

A user input type is determined for a constrained user input device, such as a neural headset. A user input signal in response to the one or more queries is received thorough the constrained user input device. The user input signal is compared with a threshold value and is associated with a query response if the intensity of the user input signal exceeds the threshold, where the query response includes a selection of a response option. The query response is caused to be stored in association with the one or more queries.

In another aspect, the present disclosure provides a computing system that implements a transformation platform. The computing system includes a neural input device, one or more memories, one or more processing units coupled to at least one memory of the one or more memories and the neural input device, and one or more non-transitory computer readable storage media. The storage media include instructions that, when loaded into the memories, cause the processing units to perform operations. The operations include implementing an interaction manager. The interaction manager is coded to provide a plurality of input type managers, including a neural input manager. At least one of the input type managers includes one or more device interfaces. The neural interface manager include a device interface for the neural input device. The interaction manager is further coded to receive user input selecting a response option for one or more queries.

The operations also implement a rendering engine. The rendering engine is coded to provide an audio renderer and a video renderer. The audio renderer and the video renderer are coded to transform the one or more queries into a format renderable to an output device. The operations implement an interaction manager coded to associate user input with a query response, and a data manager coded to send user query responses to a backend computer device and to receive queries from the backend computer device.

According to another method of the present disclosure, a plurality of queries are received. Each query includes a plurality of response fields, each response field including a plurality of response options. The plurality of response options are rendered for a first response field of the plurality of response fields for a selected one of a plurality of output types. The plurality of response options are selectively highlighted until user input is received selecting a highlighted response option as a query response.

User input provided through a hardware sensor is received. The user input indicates the selection of a highlighted response option. It is determined if the query includes additional response fields. The rendering, selectively highlighting, receiving, and determining are carried out for a next query response field. The query responses are caused to be stored.

The present disclosure also includes computing systems and tangible, non-transitory computer readable storage media configured to carry out, or including instructions for carrying out, an above-described method. As described herein, a variety of other features and advantages can be incorporated into the technologies as desired.

DETAILED DESCRIPTION

EXAMPLE 1

Overview

Figure 1:
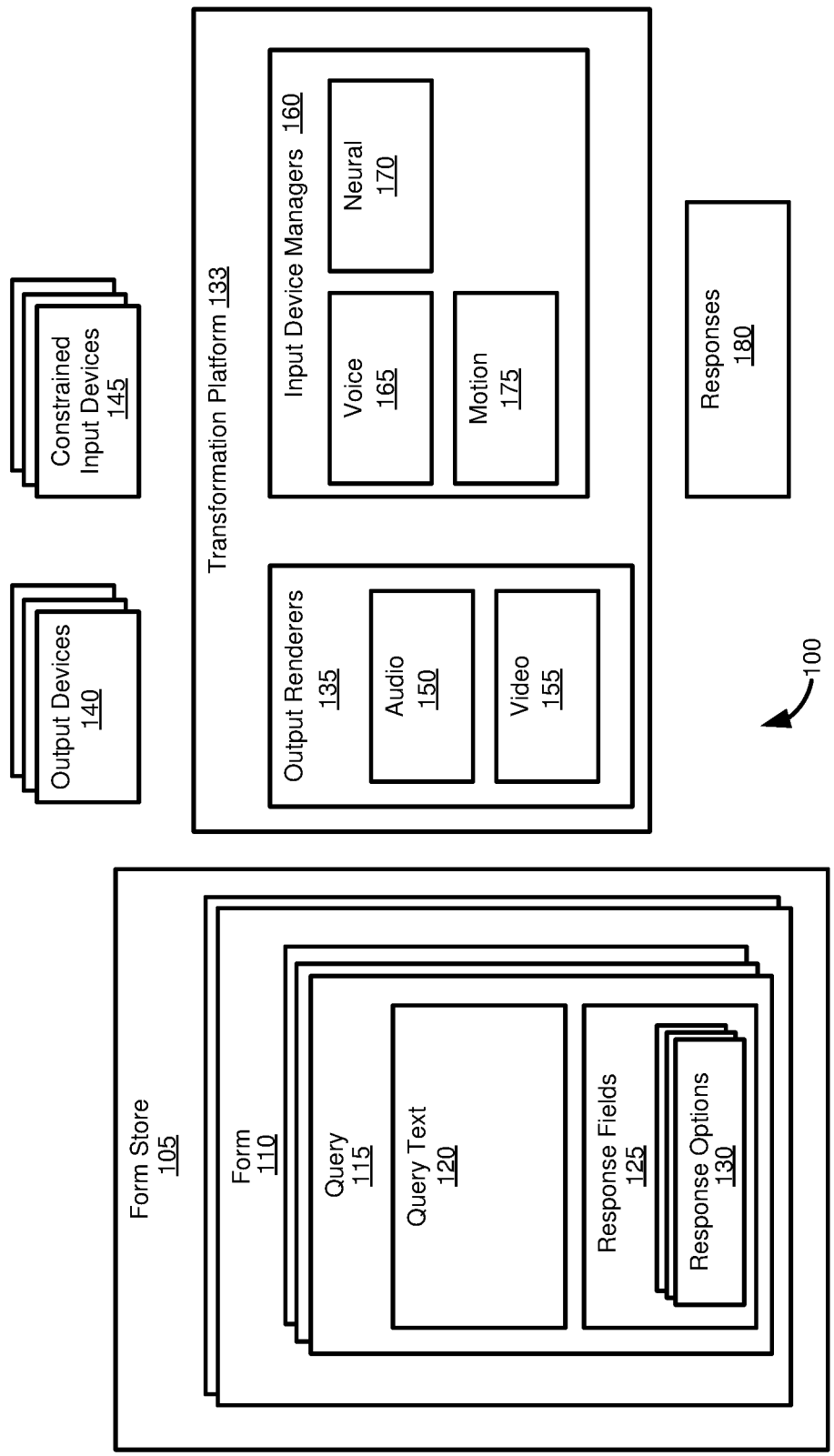
FIG. 1 is a diagram schematically depicting how a transformation platform can translate forms from a form store for output at different types of output devices, and can receive user input from different types of constrained user input devices to provide query responses.

Computer devices are ubiquitous in today's society. Despite the importance of computer devices, most computer programs are directed towards individuals of normal ability who are able to see output rendered to a display and hear output rendered to a speaker or other audio endpoint. Similarly, most general computer programs are only configured to receive input from typical input devices (e.g., keyboards and pointing devices such as a mouse, trackball, or touch screen).

Unless software is specifically directed towards disabled individuals, programs typically will have few, if any, features that make it easier for disabled individuals to interact with the software. Even if software programs provide some limited support for disabled individuals, the support is often only helpful for mildly disabled individuals. Further providing even that level of support can require significant programming effort, which is why it may be forgone in many cases. If software support for disabled individuals is provided by a program, it is typically specific to that program, and cannot easily be used in a different computer program.

There have been some attempts to make computer devices generally more accessible to disabled individuals. For example, an operating system may provide features such as speech recognition, text-to-speech capabilities, visual alternatives to audio output, and screen displays enhanced to assist the visually impaired. However, it can be difficult for a general accessibility scheme to support the needs of specific computer programs. In addition, general accessibility features may be cumbersome for a user and may not be sufficient for severely disabled individuals, or individuals whose disabilities do not match the provided accessibility features.

In some cases, the lack of effective ways for disabled individuals to interact with computer programs can result in a normally-abled individual needing to assist the disabled individual to interact with a computer, or manually carrying out a task that could be implemented with a computer program. Human intervention can dramatically increase the cost of carrying out an activity, as well as the time required to carry out an activity. The cost and time needed to carry out activities with disabled individuals may result in reduced interaction with disabled individuals. In addition, because the disabled individual is not directly providing input, there is the chance for miscommunication to occur between the normally-abled individual and the disabled individual. Accordingly, there remains room for improvement in providing mechanisms for disabled individuals to interact with computer programs, or otherwise provide for non-standard ways for individuals to interact with computer programs.

The present disclosure provides a platform or interface that can be used by a variety of software programs, or a variety of content for software programs, to render output and receive input in a variety of formats. That is, the content to be output, and information requested, can be specified in a manner that does not depend on a specific type or input or output. The platform, or interface, can determine input and output types selected by a user and automatically format or otherwise process the content to be output and render the output to an output device. Similarly, the platform can receive user input from the selected input type and convert the input into a standard format useable by the software program.

Thus, the disclosed innovations can provide a number of advantages. The platform can allow computer programs to easily provide information to, and receive information from, a range of input and output devices, without having to implement features to specifically allow the use of a particular type of input or output device. The types of input and output devices useable by the software program may only be limited by what devices are supported by the platform. If the platform is updated to support additional input or output modes, the software program can automatically use those new modes, without any additional development effort being required.

The platform is beneficial for end users, because how information is presented, and how input is received, can be tailored to specific input and output modes, and even particular input and output devices. Thus, information can be presented in a more consumable format for end users, and the end users can provide input in a more precise and natural manner.

Using the disclosed innovations, computer programs, and content deliverable or obtainable therewith, can be more accessible to end users. In particular, the present innovations can make software more accessible to disabled individuals, as programs can automatically adapt to the specific interactions mechanisms that are most useable by a particular individual. The improved interaction mechanisms can make more types of computer programs and content accessible to disabled individuals. The improved interaction mechanisms can also reduce the cost of activities involving disabled individuals, as they can be computerized or automated, and human assistance reduced or eliminated. The interaction mechanisms can also improve the accuracy of information received from disabled individuals, as the chance for miscommunication, either from the normally-abled assistant to the disabled individual or from the disabled individual to the normally-abled assistant, can be reduced or eliminated.

In addition to making it easier to deliver content to end users, and for users to interact with the content, the disclosed innovations can reduce the use of computer resources. For instance, input and output functionality can be provided to numerous applications, and associated content, using a common transformation platform. This can reduce both the coding effort required to provide certain input/output functionality, and can reduce storage requirements, as every application need not specifically include functionality for particular, possibly specialized, input and output types. In addition, content to be rendered can require less storage space, and less computing resources to process, since the content need not be specifically adapted to particular input or output modes.

The present disclosure also provides an innovative query format, where multiple response options can be displayed to a user. The response options can be selectively highlighted, and user input received associated with the selection of the highlighted response option as a query response. A query can include multiple response fields, which can be progressively rendered. Thus, the present disclosure provides a format that allows for query responses to be obtained with limited user input. This can be advantageous when, for example, a disabled individual is providing input and may find it difficult to provide complex input or a large amount of user input.

EXAMPLE 2

Example Generalized Architecture Providing a Transformation Platform

FIG. 1 illustrates a general architecture 100 in which the disclosed innovations can be implemented. The components of the architecture 100 can be implemented on a single computer device, or on multiple computer devices.

The architecture 100 includes a form store 105. The form store 105 stores one or more forms 110. As used herein, a form 110 refers to a collection of one or more queries 115. A query refers to a prompt for information. A query can be a question or a request for information. However, a query does not have to include a specific request for specific information. For instance, a query can be presenting a user with options for actions to be taken.

Each query 115 can include query text 120, and includes one or more response fields 125. The query text 120 typically provides context for response options 130 specified in the response fields 125 for the query 115. For example, the query text 120 may be a question, with a response field 125 specifying possible answers. The query text 120 may be a sentence containing one or more response fields 125, where a user is to select a response option 130 from each response field 125 to complete the sentence. The query text 120 may provide context for possible actions that can be taken, with a response field 125 providing the possible actions, response options 130. In some cases, the query text 120 can be omitted, such as when the response options 130 are self-explanatory.

The architecture 100 includes a transformation platform 133 that includes an output renderers component 135. The output renderers component 135 includes one or more renderers. Each renderer can generate a particular type of output (e.g., a format usable to generate signals to be transmitted to an output device 140) based on a query. In particular, the renderer can render the query text 120 for output, and can render the response options 130 for the response fields 125 based on both the output device 135 type and a particular type of constrained input device 145. Examples, of output devices 140 includes audio output devices (e.g., speakers, headphones, virtual reality headsets) and video output devices (e.g., a monitor, television, virtual reality headset, touchscreen, laptop display, projector).

As used herein, a constrained input device is an input device that has provides a limited number of input signals, compared with a typical, unconstrained input device, such as a mouse or a touch screen. That is, a mouse, trackball, or a touch screen is typically capable of receiving input indicating any area of a display, as well as various types of clicks or gestures. In contrast, a constrained input device may be capable of providing for a limited number of discrete input types—such as move right, move left, move up, move down, or select. In some cases, a constrained input device may be constrained because of hardware limitations on the types of input that can be provided. In other cases, an input device may be constrained because of an interface with a computing device. For example, a mouse may be a constrained input device if a computer device only recognized mouse clicks.

In at least some cases, a constrained input device is an input device that is not natively (e.g., automatically, without additional configuration being required by a user or by an application) supported by an operating system running on a computer device that receives input from the input device. For example, a constrained input device can be an input device whose input cannot be mapped to standard interface events monitored by the operating system and provided to applications running on the operating system.

Examples of constrained input devices 145 include voice or other audio input devices (e.g., microphones, or devices incorporating microphones). Although a user may, for example, speak any number of words, the interface for the microphone typically only recognizes a limited number of words or phrases. A neural input device (e.g., EEG headsets) is also a constrained user input device, as typically neural input devices are only capable of distinguishing between a limited number of gestures and mental commands. Similarly, motion capture or sensing devices (e.g., camera-based motion sensing systems, and positional sensors, such as an inertial measurement unit or components thereof, for example, incorporated into a wristband that can be used to provide input through flicking and twisting motions by the user) may only be capable of distinguishing between a limited number of gestures.

In the case of constrained input devices constrained by an interface, the interface may be constrained to assist an individual using the input device. For instance, a disabled user may not be able to fully use a keyboard. An interface may provide that only certain keys are useable to provide input, or that all keys, or a set of keys, will be associated with the same input, regardless of which key is pressed.

As discussed above, a renderer of the renderer component 135 can generate output for a response field 125 in a manner that depends on a type of input device 145 being used, as well as a type of output device 140. In one implementation, the output renderers component 135 can include an audio renderer 150 configured to generate audio output signals to cause an audio output device 140, such as a speaker, to generate audio output of the query text 120 and then response options 130 for a response field 125. For instance, the audio renderer 150 may process the query text 120 using a text-to-speech processor.

If the user will provide input using a microphone as the input device 140, the audio renderer 150 may also use the text-to-speech processor to render the response options 130 for a response field 125. A large number of response options 130 may be rendered to the output device 140 at a moderate pace, and the user may be allowed to input their response, such as by speaking the selected response option, through the microphone at any time. In contrast, if the input device 145 is a neural headset, the user may be required to provide specific neural feedback (e.g., providing a mental "push" signal) to indicate that a response option 130 rendered to the speaker is to be selected as their response.

In this case, a smaller number of response options 130 may be rendered to the speaker at one time. For example, for a long list of response options 130, the first five options might be rendered, and then the user provided options for repeating the options or proceeding to hear a next set of options. In addition, or alternatively, the pace at which the response options 130 are rendered at the speaker may be slower when the input device 145 is a neural headset than when the input device is a microphone. The user may need more time to consider a response option 130 and indicate the selection of that particular response option than if the user can simply speak a desired response option at any time (including, in at least some cases, before the response option is even rendered at the speaker).

In another implementation, the output renderers component 135 includes a video renderer 155 configured to generate video signals to cause a video output device 140 to generate a display of the query text 120 and then response options 130 for a response field 125. For example, the video renderer 155 can format the query text 120 according in a particular font, size, color, and layout. The video renderer 155 may also render the response options 130 for a response field 125 for display, including to a particular font, size color, and layout, including position relative to the query text 120.

If the user will provide input using a microphone as the input device 145, a large number, or perhaps all, of the response options 130 can be simultaneously displayed to a user, including using common display parameters. A user can simply view all of the available response options and speak the name of the response option 130 they wish to select. In contrast, if the input device 145 is a neural headset, the user may be required to provide specific neural feedback (e.g., providing a mental "push" signal) to indicate that a response option 130 is to be selected as their response. In this case, the response options 130 may be sequentially displayed to the user, and the user given sufficient time to consider a response option and indicate their selection of a response option. Or, multiple, or in some cases all, response options 130 can be presented, and particular response options can be highlighted in some manner according to a sequence (such as in a reading direction), and a user can indicate their selection of a response option by providing the appropriate input (e.g., mental "push" signal) when the desired response option is highlighted.

The transformation platform 133 can include an input device mangers component 160. The input device manager component 160 can include an input device manager for each type of supported input device 145. For instance, the input device manager component 160 can include a voice input manager 165. The voice input manager 165 can implement speech-to-text processing and/or natural language processing. A neural input manager 170 can map particular neural input signals to particular actions (e.g., select, back, next) and can determine a response selected by a user using neural input. Similarly, a motion input manager 175 can map particular motions or gestures to particular actions (e.g., select, back, next) and can determine a response option 130 selected as indicated by a user's motion.

Responses received through the input device managers component 160 can be stored in a response store 180. Typically, the responses will be correlated with a particular form, a particular query, and a particular response field. Although shown as separate from the form store 105, and the forms 110, in some cases, the responses can be stored in the form store (e.g., the form store can include the response store 180, or a form can have fields or data structures to store responses).

EXAMPLE 3

Example Form Rendering and Query Response Input

Figure 2:
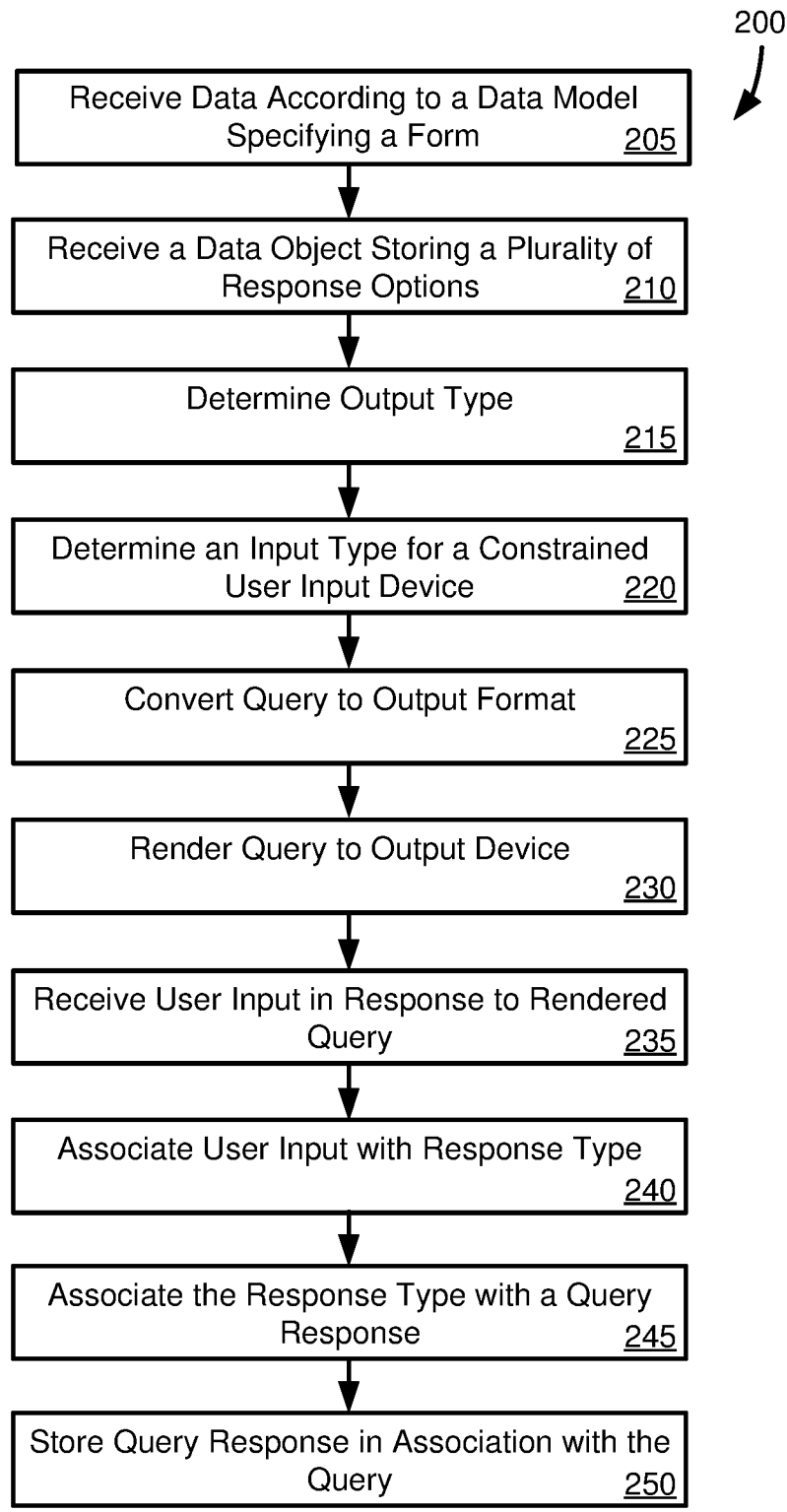
FIG. 2 is a flowchart of an example method of rendering a query for a determined output type and receiving query responses using a determined input type.

FIG. 2 is a flowchart depicting an example method 200 of how a client device can render a form having one or more queries, each having one or more response fields, for particular input and output types. The data according to a data model, the specifying a form, is received at 205. At 210 a plurality of response options are received for each of the one or more response fields associate with the form.

An output type is determined at 215. The output type can be, for example, audio output or video output. In some cases, along with an output type, a specific output device can be determined. At 220, an input type is determined for a constrained user input device. The input type can be, for example, audio input (e.g., speech or other oral input), neural input (e.g., an EEG headset), motion input (e.g., a pointing device, camera, or hardware positional sensors), or other types of input. A query of the one or more queries is converted to an output format for the output type, and optionally the input type, at 225. For instance, for audio output, the query text and the response options can be converted to audio signals using a text-to-speech converter. Or, query text and the response options can be formatted to be output to a display. The query is rendered to the output device at 230.

At 235, user input is received in response to a rendered query. The user input is optionally associated with a response type at 240. For example, the user input may be a mental "push" signal received through an EEG headset, which may be associated with the response type of "select." At optional step 245, the response type is associated with a query response. For example, the "push" signal may be associated with selecting the response option displayed (or otherwise rendered) when the "push" signal is received. The query response is stored in association with the query at 250.

EXAMPLE 4

Example Forms, Queries, and Response Option Domains

Figure 3:
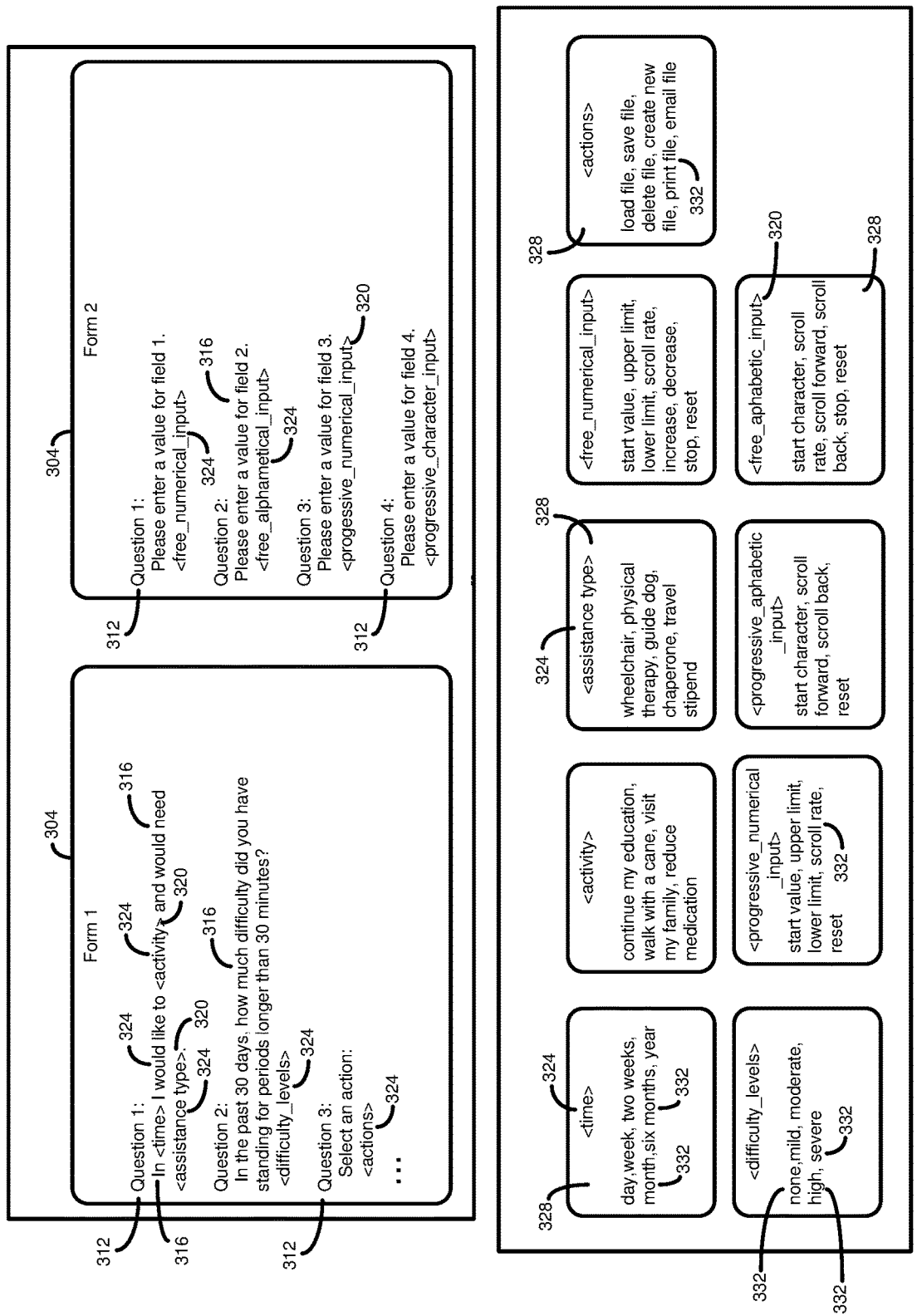
FIG. 3 is a block diagram illustrating different query formats, and how queries can include response fields associated with a domain of response options.

FIG. 3 is a block diagram illustrating examples of forms 304. Each form 304 can include one or more queries 312. As discussed in Example 2, a query 312 can be a question, but can be a more general request or indication for user input. Each query 312 typically includes query text 316. The query text 316 can provide context for possible responses a user might provide. However, in at least some cases, a query 312 can omit query text 314. For instance, the possible responses may be such that no extra context is required.

Each query 312 is associated with one or more response fields 320. The response fields 320 can be associated with metadata. The metadata can be, for example, a field name, a domain or set of possible response options, and a data type associated with the expected response (e.g., an integer, a character, a string). The domain can be an indicator for data associated with a particular form 304, or can be associated with a more general repository. For instance, a repository may be provided that provides a set of domains relating to standard data used for a particular process.

As shown in FIG. 3, the response fields 320 have a name 324. Each name 324 is associated with a domain 328 of response options 332. The response options 332 can be specified at design time, and are populated into the corresponding query 312 at runtime. Thus, the response options 332 can be changed, if desired, without having to modify the queries 312 or the forms 304. The use of the domains 328 can also facilitate the creation of new forms 304 and queries 312, as a user can pick from, and optionally edit, sets of preexisting response options 332.

FIG. 3 illustrates a variety of types of queries 312. A particular query 312, Question 1 of Form 1, includes three response fields 320. Each of the response fields 320 is associated with a different domain 328. However, in some cases, multiple response fields 320 of the same query 312 could be associated with the same domain 328. When Question 1 is rendered, each response field 320 can be progressively rendered. So, first the response options 332 in domain 328 for <time> would be rendered to an output device. After a user selects their desired response option 332 (including potentially skipping providing a response option or indicating that the response field 320 does not apply to them), the next domain <activity> would be rendered. After user selection of the desired response option 332 for the <activity> domain, the response options for the domain 328 for <assistance type> would be rendered. After user selection of the desired response option for the <assistance type> domain, the next query 312, Question 2 of Form 1, would be rendered to the output device.

The domains 328 for Question 1 of Form 1 include a plurality of discrete answer choices. However, other domains 328 can provide more open or free-form response options 332. Some queries 312, such as Questions 1 and 2 of Form 2, can request free numerical or alphabetical (or character) input. Domain 328 for <free_numerical_input> includes response options 332 that can allow a user to freely provide numerical input. For example, the response options 332 include a specified starting value and can include upper and lower limits. In other cases, the response options 332 need not include an upper or lower limit. The response options 332 can include options that allow a user to increase or decrease a numerical value currently being displayed. In some cases, when a user selects to increase or decrease a value, the value may continue to increase or decrease until the user takes another action, such as selecting to scroll the value in the opposite direction or selecting the same scroll direction again (which can cause scrolling to cease). The response options 332 can also include a specific option to stop scrolling, or to reset the value to the starting or default value.

In some cases, at least a portion of the response options 332 can be implemented by a component of a client device, such as the output renderers component 135 or the input device managers component 160 of FIG. 1. For instance, a component of the client device can recognize particular types of response field formats, or a response field can include an identifier specifying a particular format. When a response field 320 is recognized as a free form numerical response field, the component of the client device can implement features to allow a user to select a value, increase or decrease a value, or reset a value, and can specify a scroll rate (e.g., if a user "holds" an increase option, how fast the numbers increase, which can be a variable rate, such as starting slowly and then increasing the longer the user "holds" the increase option, and by what increments the number increase, which can also increase the longer the user "holds" the increase option). The component, or the response options 332 of a domain 328, can also specify an increment value for the numerical input. For example, in some cases, selecting to increase the value may cause the number to increase by one, while in other cases selecting to increase the value may cause the number to increase by ten.

Domain 328 for <free_alphabetic_input> can be implemented in a similar manner as <free_numeric_input>. That is, the response options 332 can include a start character, options to scroll forward and backward through a list of characters (e.g., an alphabet), options to stop scrolling or reset to a default or starting value, and can specify a scroll rate. As with free numeric input, some of all of these response options 332, or additional input features, can be implemented by the output renderers component 135 or the input device managers component 160.

Some queries 312, such as Questions 3 and 4 of Form 2, can allow for progressive input of values, such as numbers or characters. That is, while free alphabetic input or numeric input allows for more discretion on the part of a user, in some cases, a more controlled display of response options may be desired, while providing for a larger range of possible responses than a fixed list, or allowing the response options to be implemented more easily or compactly than a fixed list. The response options 332 for progressive input types can be generally as described above for free alphabetic or numeric input, including having some, all, or additional response options being implemented by a component of a client device.

However, progressive response options 332 can be rendered differently than free response options. Progressive response options 332 can be rendered by providing a list of values that are progressively highlighted or otherwise made available for selection by a user. If a user does not make a selection, or selects to view another list of values higher or lower in a set that the currently displayed list, another list of values can be presented to the user. In free form input, a single value can be presented to a user, and dynamically altered in response to user selection to scroll through possible values.

As previously mentioned, a query 312 does not need to be a question, but can be a request, including a directed request, for user input. For instance, Question 3 of Form 1 includes query text of "Select an action," which is linked to a domain 328 of <actions>, providing response options 332 of loading, saving, deleting, creating, printing, or emailing a file.

EXAMPLE 5

Example Rendering of Queries and Response Options

Figure 4A:
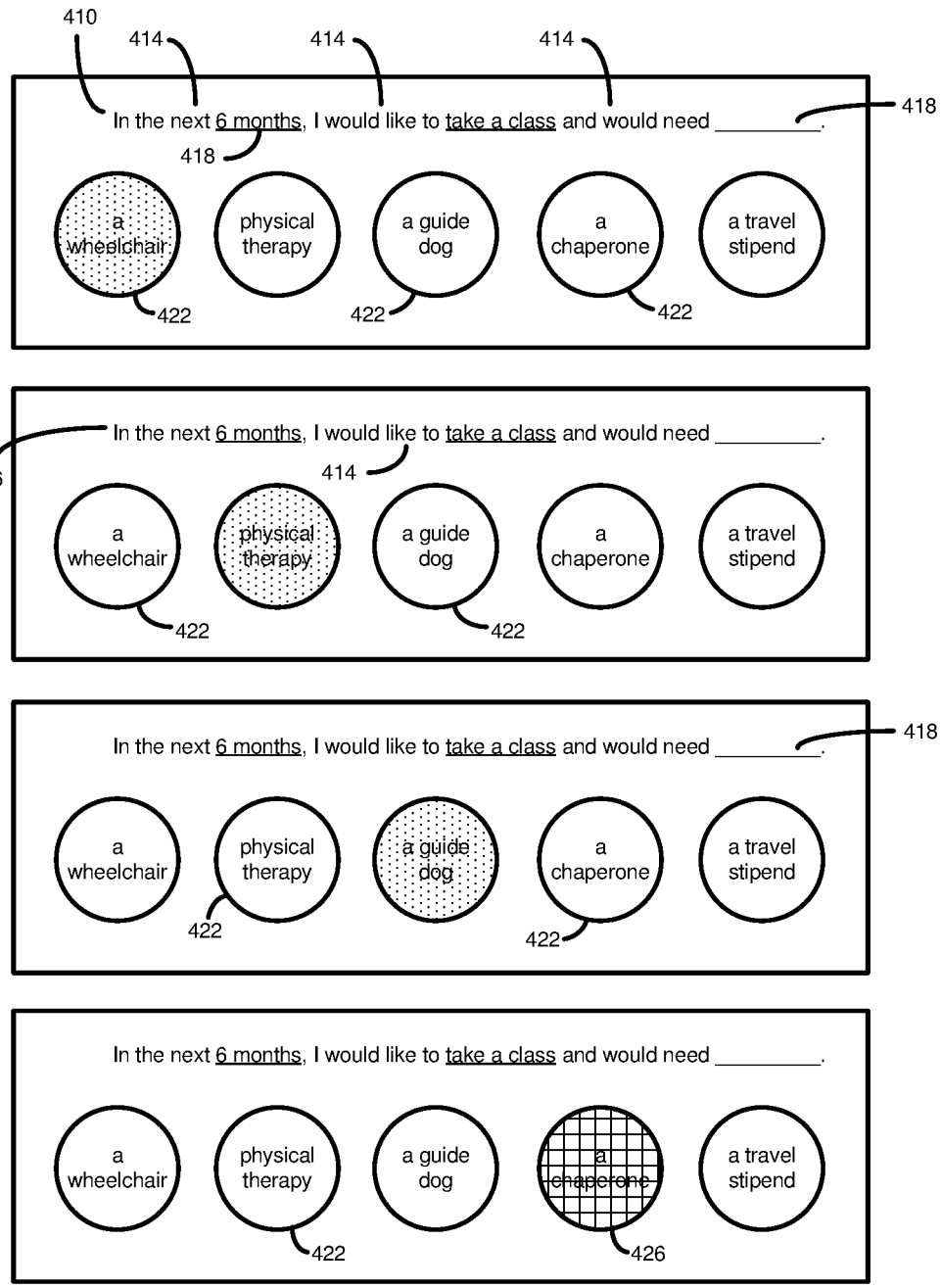
FIG. 4A is a diagram illustrating the selective highlighting of response options for a response field and user selection of a highlighted response field.
Figure 4B:
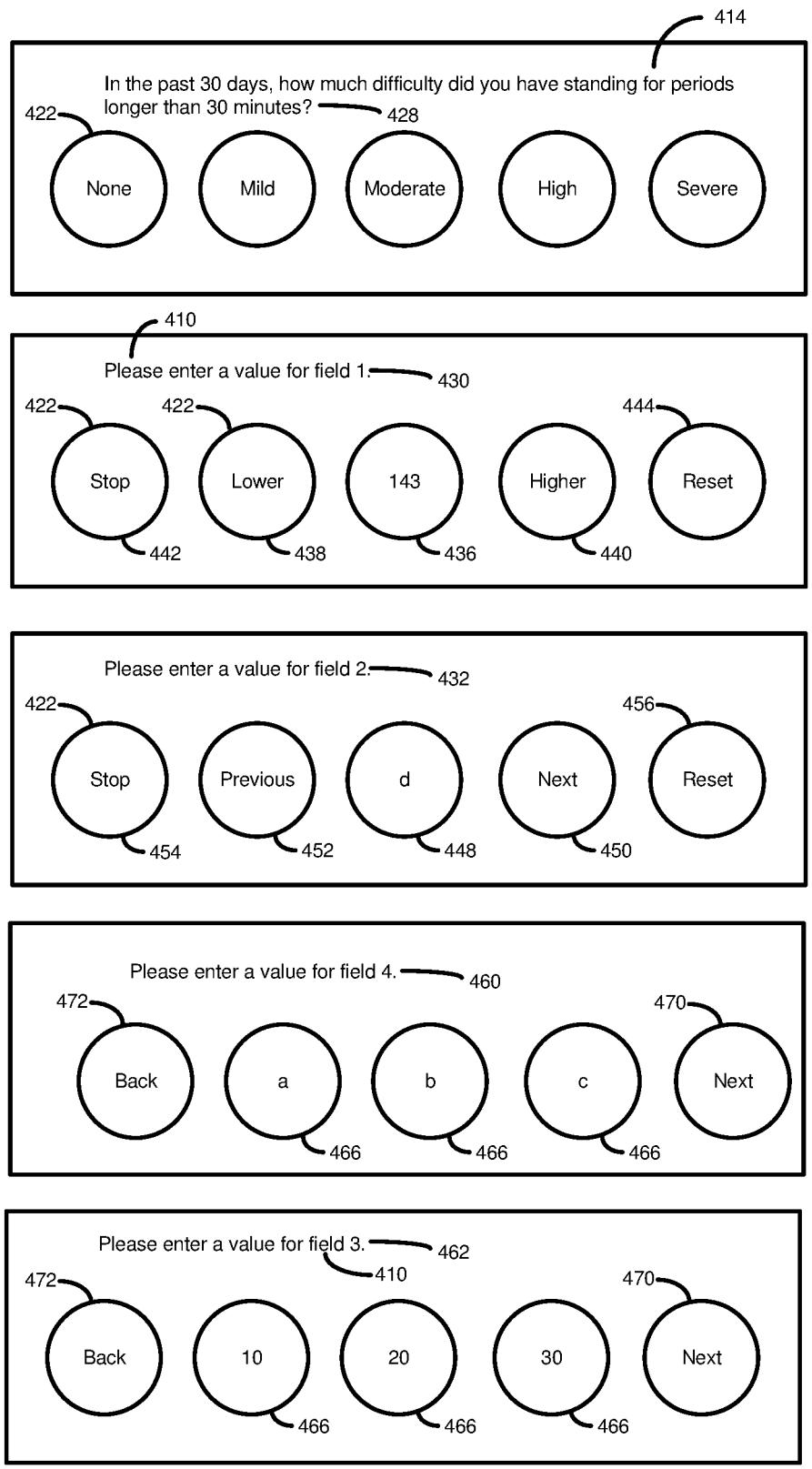
FIG. 4B is a diagram illustrating a variety of query and response option formats.

FIGS. 4A and 4B present examples of how queries 410 can be rendered for display. Each query 410 includes query text 414, one or more response fields 418, and a plurality of response options 422. For queries 410 having multiple response fields 418, the response options 422 are presented for a single response field. In practice, the response fields 418 would be processed in sequence, with response options 422 for later response fields 418 being rendered after the user selected a response option for an earlier-displayed response field.

FIG. 4A illustrates how, for a query 426, response options 422 for a response field 418 (e.g., <assistance_type> of FIG. 3) can be rendered and sequentially highlighted or otherwise indicated as a current response option available to be selected by a user. The user can provide selection user input, which can depend on a particular type of input, and a particular input device, to indicate their selection of a highlighted response option 426. The response options 422 are typically highlighted (e.g., an element that functions as a cursor or control highlighter that indicates a currently active response option, or input action) in an order, which can be, for example a reading direction (e.g., for English, left-to-right and top-to-bottom). However, in other cases, the response options 422 can be highlighted in a different order, can be highlighted without being in an order, or are not highlighted (e.g., when a user is able to select any rendered response option). When the response options 422 are highlighted in an order, if the last response option in a set is presented to the user, and the user has not made a selection, the highlighting of the response options in the order can be repeated (including until the user makes a selection).

Although shown rendered visually, the query 410, including query text 414, response fields 418, and response options 422 can be rendered in a similar manner for audio output. For instance, the query text 414 preceding a response field 418 can be processed using a text-to-speech converter. Each response option 422 can be processed and rendered in turn using the text-to-speech converter. If the user selects a response option 422, and there are additional response fields 418 in the query 410, any query text 414 preceding the next response field 418 can be rendered to an audio endpoint, and the response options rendered. Any additional response fields in the query can be processed in a similar manner.

When a user selects a response option 422, an indication of the selection can be provided. For instance, as shown in FIG. 4A, the response option 426 of "a chaperone" is shown in different visual style to indicate its selection. When the output is audio, the selection indication can be a repetition of the selected response option 422 or another audio signal (e.g., a bell or chime).

Query 426 shows response fields 418 as embedded within the query, and with a defined set of response options 422. Query 428 of FIG. 4B illustrates query text 414 that does not include an embedded response field 418. Rather, the query text 414 of query 428 presents a question and the response options 422 are a defined set of possible responses to the question.

Queries 430, 432 depict how response options 422 can be free form input, such as input of numbers or characters, respectively. Query 430, including response options 422 for free form numerical input, includes a display of a current value 436, an option 438 to select a lower value, and an option 440 to select a higher value. In some cases, selecting one of options 438, 440 can cause the value 436 to change in the indicated direction (e.g., increasing or decreasing) until a user selects a displayed value as their selected response or selects a stop option 442. A reset option 444 can be provided, which can allow the displayed value 436 to revert to a starting or default value.

Similarly, query 432, including response options 422 for free form character input, includes a display of a current value 448, an option 450 to move to a next character, and an option 452 to move to a previous character. In some cases, selecting one of options 450, 452 can cause the value 448 to change in the indicated direction (e.g., moving to a next or previous character) until a user selects a displayed value as their selected response or selects a stop option 454. A reset option 456 can be provided, which can allow the displayed value 448 to revert to a starting or default value.

In some cases, the response options 422 for queries 430, 432 can be highlighted sequentially, as shown in FIG. 4A. In other cases, the user can select any of the displayed response options at any time. In the case of audio output, the possible response options can be read (e.g., using a text-to-speech converter) to a user, and the user can select an appropriate response option 422 once a desired value is reached.

Queries 460, 462 depict how response options 422 can include progressive response options that allow more flexibility for particular types of responses, and easier implementation, than selection from a defined set, but can provide a more useful interface in some circumstances than the free form input of queries 430, 432. Each query 460, 462 includes a plurality of displayed values 466. The user can choose to select one of the displayed values 466 as their response. If the user's desired response is not in the displayed values 466, the user can select an option 470 to go to a next set of displayed values or an option 472 to go to a prior set of displayed values.

Although not shown, the user can be given an option to change how, or what, response options 466 are displayed (or rendered via audio output, or other output type). For instance in query 462, the displayed numbers increase by ten for each response option 466. The user can be allowed to select a smaller increment value (e.g., increasing by one between each response option 466) or a larger increment value (e.g., increasing by one hundred between each response option).

EXAMPLE 6

Example Architecture Including Client Device, Backend Device, and Database

Figure 5:
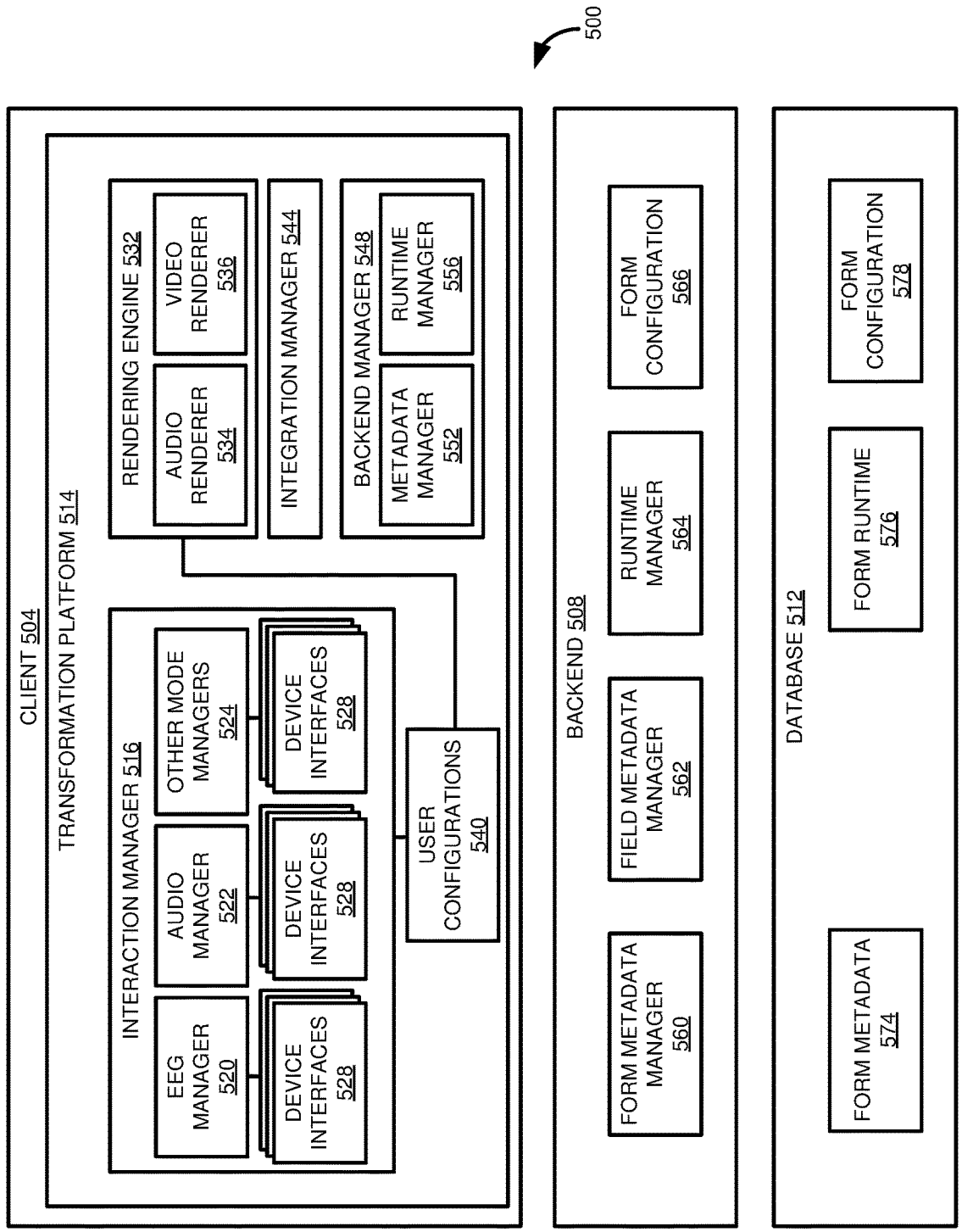
FIG. 5 is a block diagram illustrating an example software architecture in which a client device, a backend device, and a database can interact to allow the client device to render queries, and receive query responses, using a common query format.

FIG. 5 illustrates an example architecture 500 which can be used to implement the disclosed innovations. The architecture 500 includes a client computer device 504, a backend computer device (or system) 508, and a database 512. Although shown as separate computer devices, in some cases, the functionality of the client computer device 504, the backend computer device 508, and the database 512 can be implemented on a single computer device. Similarly, the architecture 500 can include additional computer devices, which can provide additional functionality, implement some of the functionality of the client computer device 504 and/or the backend computer device 508 and/or the database 512, or combinations thereof.

The client computer device 504 includes a transformation platform 514 that includes an interaction manager 516. The interaction manager 516 can be the input managers component 160 of FIG. 1. The interaction manager 516 includes one or more input mode, or type, managers, including for one or more constrained input devices, such as one or more of an EEG manager 520, an audio manager 522, and managers 524 for other input modes. The interaction manager 516 also includes one or more device interfaces 528 for each of the input mode managers 520, 522, 524. The device interfaces 528 can be specific to particular types of hardware devices.

For example, different EEG headsets can have different number of sensors, can be capable of recognizing different types of gestures or mental commands (or other input), can have different sensitivities, and can, in general, have different input/output capabilities and parameters. The device interfaces 528 serve to map each of the input devices to a common schema used by the respective mode manager 520, 522, 524. In this way, when a new input device is to be included in the architecture 500, a new device interface 528 can simply be added, and the mode managers 520, 522, 524, other components of the client computer device 504, or component of the backend computer system 508, can use the new input device without any changes to their operation, or forms or queries rendered therewith.

In some cases, the raw signals produced by a constrained input device, such as a neural headset, may not be sufficient to be unambiguously associated with an action (e.g., a particular user response, such as selecting or a navigational action). In order to help disambiguate the action to be associated with a raw input signal, one or more thresholds can be set for each available user action. The following table provides an example of how a device interface 528 can be configured for use with an interaction manager for a constrained input device, in this case an EEG manager 520.

| Input Type | Threshold Intensity | Duration Range (seconds) | Executed Action | Status |
|---|---|---|---|---|
| Gesture-Lower Face-Smile | | 0 | | Inactive |
| Gesture-Eye-Look Left | 0.4 | [1.0-3.0] | Move to previous response item/set | Active |
| Gesture-Eye-Look Right | 0.4 | [1.0-3.0] | Move to next response item/set | Active |
| Gesture-Neutral | | | Reference | Active |
| Mental Command-Push | 0.1 | [2.0-5.0] | Select response item | Active |
| Mental Command-Pull | 0.1 | [2.0-5.0] | Reset value/selection | Active |
| Mental Command-Neutral | | | Reference | Active |

The input types can be mapped to particular input signals received from the particular input device. The duration range, intensity, other parameter, or combination thereof can help provide that input is received consistently from different input devices of the same type. That is, the values (e.g. threshold intensities and durations) for each device interface 528 (e.g. including a table or other parameter mapping similar to the above for each specific device) can be mapped to a common schema (the input types, actions, and statues) or interface, which can then be made available to applications. As an example, while the table above provides numerical intensities, another device may report values as being "high," "medium," or "low," may report values in a different unit or scale, or may have a different sensitivity than another device. Or, certain input types may not be available on a particular device, and so, for different devices, different input types may be mapped to the same executed action. The transformation platform 514, through use of the schema, can provide an abstraction such that applications are able to user the results of particular actions without having to worry about the particular hardware details of a user input device, or even the type of user input device.

Each device interface 528 can implement event listeners using a specific interface (e.g. API), such as an interface provided by a hardware manufacturer. The listeners can receive a data stream provided by the hardware interface. For instance, a neural headset may produce a data stream that reports detected input types, along with a measured intensity, at various intervals, such as every tenth of a second. The listeners of the device interface 528 for the specific device can monitor the output stream and take action if a threshold intensity, and optionally duration, is exceeded. As described herein, both the threshold intensity and duration can be set for a particular user to provide a desired detection sensitivity (that is, assigning signals that the user intends as actions to an input type, while not associating noise or inadvertent signals with an input action).

The intensity and duration settings may be weighted to provide a desired response profile. For instance, intense signals of short duration may be associated with an action as well as less intense signals received over a longer duration. A duration can be determined by a time, a number of signals received over a period (e.g. using a counter), including using an average or other weighting of number of signals, and optionally intensity, over a time period (e.g., five successive signals exceeding a threshold intensity may be selected to trigger an input action, or the receipt of six signals exceeding the threshold intensity out of a rolling window of ten signals may be selected to trigger an input action).

At least a portion of the input types are associated with an action to be executed when input of the corresponding input type is received. As shown, the executed actions are either related to response navigation or selection, or are used as a reference value. As shown, some input types may not be associated with an executed action. An input device may be capable of distinguishing and reporting more input types than are needed for response navigation or selection. In some aspects, input types can be mapped to executed actions that are not response navigation or selection. For instance, the device interface 528 may be configured to allow a user to interact with a software program, and particular input types can be mapped to particular actions in the software program.

As described above, in some cases, the raw signals produced by a constrained input device, such as a neural headset, may not be sufficient to be unambiguously associated with a selected action, and so the raw signals from the device can be compared with intensity or duration thresholds, or other parameters, before being associated with a particular action to be executed. In addition, there may be signal differences that result when the same device is used by different users to provide input. That is, a signal produced by a first user that is associated with, and results in, an action, may not be produced, or produced at the same level by, a second user.

Accordingly, particular types of constrained user input devices, or particular user input devices, can be trained for a specific individual. The thresholds can be adjusted for each individual user.

In particular examples, the threshold can be determined relative to a standard. For example, gestures may be determined relative to a neutral facial position. Mental commands may be determined relative to a user's brain activity when in a calm, meditative state. A signal for an input type can be associated with a specific action to be executed when the measured signal for the input type exceeds the threshold(s), or exceeds the threshold(s) by a selected amount. A described above, in addition to a signal intensity exceeding a threshold intensity, the threshold for an action being taken can include a duration or signal count threshold.

The thresholds, or in some cases, mapping of signals to actions, can be adjusted as an individual uses a constrained input device to interact with forms and queries. Heuristics, machine learning, and other feedback or training techniques can be used to analyze user behavior and adjust thresholds for a user action. For instance, repetition of an input signal at a level below a threshold can trigger an algorithm that recognizes the pattern as more than background noise, and adjusts the threshold so that the lower intensity signals are recognized as being associated with a particular action. If a user repeatedly makes a selection to change a prior answer, it may indicate that the threshold for selecting a response is too low. In this way, the thresholds can be auto adjusted or corrected, dynamically, to provide greater accuracy.

In addition, or alternatively, the user, or an individual assisting the user, can provide an indication to the device interface 528, or the input mode manager 520, 522, 524, that the threshold should be adjusted, or the signal mapped to another action. In either case, more sensitive interaction with the constrained input device can be achieved the longer the user interacts with it through the transformation platform 514. Thus, the transformation platform 514 can be self-training and self-adjusting.

Training information for particular user input device types, or devices, information gathered during periods where a user interacts with forms and queries using a particular constrained user input device (e.g., calibration or adjustment data obtained based on prior instances of the user interacting with forms and queries using a particular constrained user input device), a user configuration profile, or combinations thereof can be stored in a user configuration store 540. The user configuration store 540 can also store information such as preferred user input and output devices and input and output devices previously registered for use with the client computer device 504. Although the user configuration store 540 is shown as part of the transformation platform 514, all or a portion of the user configuration store can be stored in another location. For example, training date (e.g., signals measured from user input and associated with input types), can be stored in association with software for the input device, such as a SDK for the input device. In such a case, the user configuration store 540 can store an indication of whether a particular device has been trained for a particular user, but the actual training data can be maintained in another location (e.g., as specified by the device SDK).

When a user, or an application, activates the transformation platform 514 and selects an input device, the user configuration information for the particular input device type (e.g., a microphone, regardless of the particular model, may be handled by a common device interface 528), or input device (such for a particular brand or model of neural headset), can be retrieved from the user configuration store 540 and mapped to the device interface.

When a user selects an input device, the user configuration store 540 can be checked to determine whether a profile exists for the user for that input device. If the profile does not exist, the user can be prompted to train the input device, and the profile so produced stored in the user configuration store 540. If the profile does exist, the profile can be loaded from the user configuration store 540 for use with the corresponding device interface 528. Loading the profile can include adjusting the profile by modifying a training data set based on adjustment data obtained during prior use of the input device by the user. In other cases, when thresholds are modified based on automated- or user-correction, a modified profile can be created and stored in the user configuration store 540.

When a user profile is loaded from the user configuration store 540, other parameters can be used to adjust thresholds populated to the device interface 528. For instance, at least some neural headsets are able to determine an individual's mood. An individual's mood may affect how distinguishable gestures and mental commands are from background. If user is angry or upset, background noise may be higher than if the user is calm. Thus, if the user is determined to be calm, the required signal intensities can be raised, and durations lowered, for detection of user actions. If the user is angry or upset, the intensity difference versus baseline needed for a user action can be lowered, but the required duration, or number of signal needed to trigger an action, can be raised.

As described above, in some cases, a user may be prompted to train a user input device before using the input device to respond to queries or interact with a software program. Or, the user may be asked to retrain or update all of a portion of the configuration information. For instance, a user may be asked to train a resting state, and action thresholds can be recalculated with respect to a current signal associated with a resting state (for example a current mental state of a user may differ from a prior mental state of the user, which may be reflected in other actions being easier or harder to detect or disambiguate). If the transformation platform 514 determines that user actions are not being appropriately disambiguated (e.g., the user repeatedly changes their response, or selects opposing navigation options), or that signals are not being adequately distinguished from background, the user can be prompted to retrain all or a portion of user actions, or a resting state. In particular, if the transformation platform 514 determines that input actions are not being accurately detected, the user can be prompted to retrain a neutral input response, and the determined value used to recalculate the thresholds for user input actions.

With reference to the table above listing types of user input, a user may be asked to perform the various gestures, mental commands, or other input (e.g., in the case of verbal input, speaking the corresponding verbal command, or making an appropriate gesture) that will be associated with user actions, including repeating the input until it can be recognized with a desired degree of confidence. When a user is prompted to provide input, the resulting signal intensity can be associated with a positive indication that the action is being performed. In order to set a threshold, a difference between the measured action intensity and a baseline intensity can be determined. A percentage of the difference (for example, 50%) can be selected as the input signal required to trigger a response for the action, and the determined percentage of the difference added to the baseline value to produce the trigger threshold for the action.

In some cases, a user profile can include a number of controls (e.g., possible user input options, or a number of response options to be concurrently rendered) to be presented to a user. If a user's current profile indicates that a limited number of user input actions are available (e.g., can be disambiguated based on the raw signals from the constrained input device), fewer controls may be presented. For instance, fewer response options may be presented to a user at one time.

Or, a query, or response options for a particular query response field, can be presented in a different format depending on the configuration profile information, including information based on training, or updated training data. For instance, if fewer user actions are recognizable, a response field may be presented in a progressive format rather than a freeform format.

A user, such as during training, can indicate preferences for rendering of response options, including whether response options should be rendered in progressive or freeform format, and a number of response options (or other controls) to be currently made available to the user. While some users, for instance, may be comfortable selecting between five response options, other users may only be comfortable with selecting between three response options. Any automatically or user-configured control preferences can be associated with the users profile and optionally stored in the user configuration store 540.

The mode managers 520, 522, 524 can include features to associate user input with response input or other user actions. For instance, the audio manager 522 can include a speech-to-text processor and natural language processing in order to recognize user commands and convert audio user input (such as speech) into more easily stored or manipulated form (e.g. text).

Although the interaction manager 516 typically supports less commonly used input types and devices (e.g., voice input or EEG headsets), the interaction manager 516 can include mode managers 524 for more conventional types of user input, including pointing devices, such as touch screens, as well as devices that can be operated as constrained input devices or non-constrained input devices (e.g., a neural headset that is able to emulate a pointing device). In this way, a client device 504 can, for example, support use by both disabled and normally-abled individuals.

The transformation platform 514 includes a rendering engine 532. The rendering engine 532 can be the output renderers component 135 of FIG. 1. The rendering engine 532 can including renderers for various output types supported by the client computer device 504. In particular, the rendering engine 532 includes an audio renderer 534 and a video renderer 536 (e.g., that renders content to a display, which content can be a static user interface or an interface that includes video content as a sequence of frames or images). The audio renderer 534 can include a text-to-speech converter.

In some cases, the rendering engines 532 can be configured to render particular types of query response options in particular ways. For example, if a response field specifies freeform or progressive response options, the rendering engines 532 can render standard response options that may not be directly specified by the query, such as options to increase or decrease a value, reset a value, or stop a value from scrolling. In some cases, particular parameters of freeform or progressive response fields can be specified by the query, such as a starting value, upper and lower bounds, and an increment value or rate.

The transformation platform 514 can include an integration manager 544. The integration manager 544 can correlate user responses received through a constrained input device to a particular response option associated with a particular response field. The integration manager 544 can also provide response options for a response field in a format useable by the rendering engines 532.

The integration manager 544 can be in communication with a backend manager 548 of the transformation platform 512. The backend manager 548, such as using a runtime manager 552, can be responsible for receiving forms, queries, response fields, and response options from the backend computer device 508 and providing the data to the rendering engines 532, including through the integration manager 544. The backend manager 548 can also send, such as using a metadata manager 556, response information, or data objects modified to include the response information, including in conjunction with the integration manager 544, to the backend computer device 508.

The backend computer device 508 can include a form metadata manager 560. The form metadata manager 560 can maintain information regarding the layout of forms (and particular queries and response fields thereof). The form metadata manager 560 can also maintain mappings to domains for response fields stored in a field metadata manager 562. The field metadata manager 562 can, for example, represent response fields that can be used by a variety of forms and queries, including forms and queries of different users. The field metadata manager 562 can control what response fields are made available to particular forms. In some cases, forms and queries can have custom domains for a response field. The form metadata manager 560 can also include mappings between the response fields and the custom domain.

The backend computer device 508 can include a runtime manager 564. The runtime manager 566 can retrieve forms, queries, response fields, and response options and send them to the client computer device 504. The runtime manager 564 can also receive responses, or modified data objects including response information, and cause the responses or modified data objects to be stored. In a particular example, the runtime manager 564 sends an object (e.g., a variable, pointer, struct, or abstract data type) to receive user input at the client computer device 504. The object is associated with a particular response field. When the object is received back from the client computer device 504 with the user input, the user input is mapped to the corresponding response field of the backend computer device 508, such as using the field metadata manager 562.

The backend computer device 508 can include a form configuration component 566. The form configuration component 566 can be accessed by one or more users in order to create and manage forms. For instance, a user can use the form configuration manager to create queries, associate response fields with queries, and select an appropriate domain of response options for each response field.

The backend computer device 508 can be in communication with the database system 512. The database system 5512 can store information created and managed by the backend computer device 508, including information provided by the client computer device 504 (e.g., user responses). A form metadata store 574 can store form metadata, including metadata that associates a particular form with a particular user or application. A form runtime store 576 can store user response data for a particular form, including for a particular instance of completing a particular form. The form runtime store 576, in some cases, can also store custom domain information for forms. A form configuration store 578 can store configuration information for forms, including information regarding form content and layout.

The architecture 500 can include more or fewer components than shown, and may be organized in other manners. For example, functionality of a particular component can be carried out by another component. In addition, in at least some cases, functionality can be carried out using multiple components. In a specific example, all or a portion of the functionality of the client device 504, backend device 508, and database 512 can be combined in a single system. Further, in some implementations, the interaction manager 516 and rendering engine 532 and/or the integration manager 544 and the backend manager 548, can be combined in a single component.

EXAMPLE 7

Example Rendering of Query Response Fields and Selection of Query Response

Figure 6:
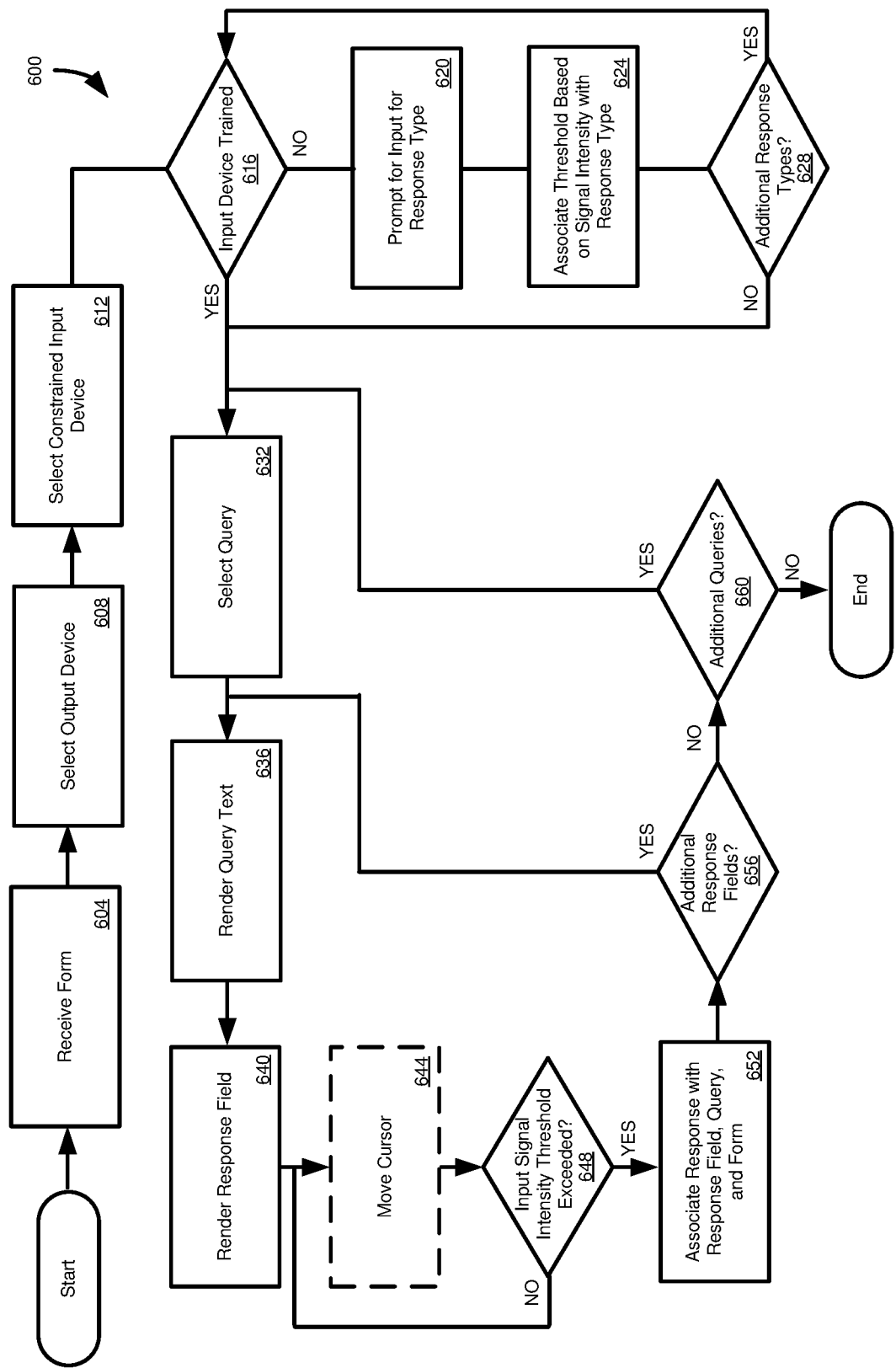
FIG. 6 is flowchart of a method for rendering a form having one or more queries using a determined output type and receiving user input using a determined input type.

FIG. 6 is a flowchart of an example method 600 for rendering a form having one or more queries, each having one or more response fields, and receiving user query responses according to an embodiment of the present disclosure. At 604, a form is received having one or more queries, each query having at least one response field having a plurality of response options.

An output device to which the form will be rendered is selected at 608. In some cases, the output device can be selected based on user input. In other cases, the output device can be determined by an application setting (including based on prior user selection of an output device) or by analyzing available output devices of a client device. At 612, a constrained input device is selected for receiving user input, including query responses. Selecting a user input device can include receiving user input selecting the input device. In other cases, the input device can be determined by an application setting (including based on prior user selection of an input device) or by analyzing available input devices of a client device.

It is determined at 616 whether the selected constrained user input device has been trained. If the user input device has not been trained, at 620, the user is prompted to provide input for a response type (such as selection of a query response option, or navigation of query response options). The signal intensity, or a confidence value, is determined and used to produce a threshold for detection of the response type and associated with the response type at 624. At 628, it is determined whether any additional response types are to be trained. If additional response types are to be trained, the method returns to 620.

If all needed response types were determined at 628 to have been trained, or if at 616 it was determined that the user input device was trained, the method proceeds to 632, where a query of one or more queries of the form is selected. At 636, query text is rendered to the selected output device. In some cases, 636 can be omitted, such as if the query responses do not require additional explanation. A query response field is rendered to the output device at 640. The query response field includes one or more response options.

Optionally, at 644, query response options are selectively highlighted, such that the user can select a highlighted query response option as their response for the response field. Highlighting a query response option can include providing a visual indication that the query response option is "active," such as displaying the response option in a different size, font, or color. Highlighting a query response option, in the case of audio output, can include selectively outputting audio content indicating a response option, such as processing the response option using a text-to-speech processor and rendering the resulting signals to an audio endpoint (e.g., speaker or headphones).

At 648, it is determined whether a user input signal exceeds a threshold for a query response (e.g., whether signals received can be associated with a user input action, such as a selection action). If an appropriate user input signal has not been received, the method returns to 644, or waits until a user query response is received. If a query response has been received, the response is associated with the query response, response field, and form at 652.

It is determined at 656 whether any additional query response fields are to be rendered for the current query. If additional query response fields are to be rendered, the method 600 returns to 636. If no additional query response fields are to be rendered for the current query, it is determined at 660 whether the form includes additional queries. If the form contains additional queries, the method 600 returns to 632. If no additional queries are contained in the form, the method 600 ends.

It should be appreciated that the method 600 can contain more, fewer, or different steps. In additions, the steps shown in FIG. 6 can be carried out in a different order. For instance, receiving a form can be carried out after one or more of selecting an input device, training an input device, and selecting an output device.

EXAMPLE 8

Example Integration of Applications and Constrained Input Devices

As described in the preceding Examples, an advantage of the disclosed innovations is that they provide for data input and output that is both independent of, or agnostic to, applications, and independent of, or agnostic to, a particular output device or input device (e.g., a constrained input device) used during runtime. Because the transformation platform can render content provided in the data model for any output device for which a renderer has been provided, and can receive input from any constrained input device associated with an input device manager, the transformation platform is a cross-application platform that generic to applications and provides an abstracted interface to the applications that requires zero configuration on the part of the applications providing or receiving information in the data model. In particular, preexisting programs, not specifically programmed for a particular output device or a particular constrained input device, can take advantage of interactions mediated by the transformation platform simply by providing data in the appropriate data model.

EXAMPLE 9

Computing Systems

Figure 7:
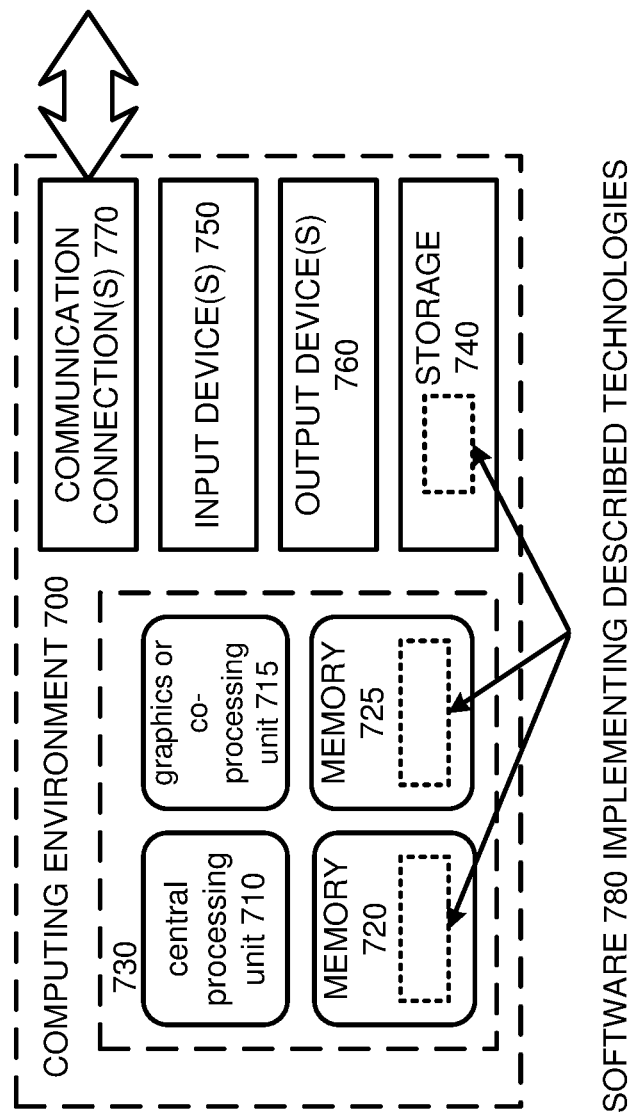
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the architecture 500 of FIG. 5, including the transformation platform 514, or the components of the backend device 508. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store database data, such as data associated with the database 512 of FIG. 5.

A computing system 700 may have additional features. For example, the computing system 700 includes storage 740, one or more input devices 750 (e.g., the input devices 145 of FIG. 1), one or more output devices 760 (e.g., the output devices 140), and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700 (e.g., voice input, motion or gesture input, or neural input). The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein. In various examples described herein, a module (e.g., component or engine) is described as being "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

EXAMPLE 10

Cloud Computing Environment

Figure 8:
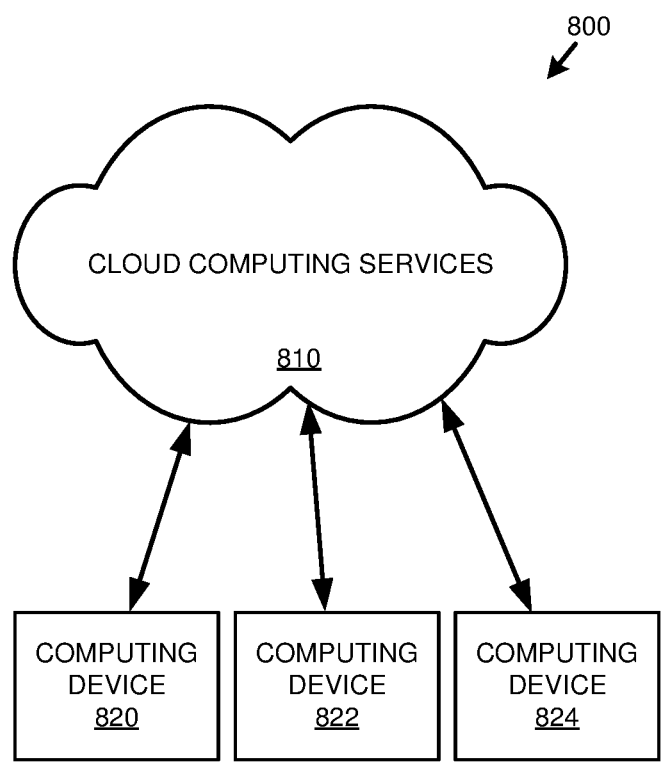
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

EXAMPLE 11

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more computer-readable storage media storing computer-executable instructions for causing a computer system to perform processing to render a query for an output device, the processing comprising:

receiving data according to a data model, the data model specifying a form comprising one or more queries, each query comprising query text and at least one response field;

receiving a data object storing a plurality of response options for the at least one response field;

converting the one or more queries to an output format for an output type;

rendering the one or more queries to an output device of the output type;

determining an input type for a constrained user input device, wherein the constrained user input device is limited to a fixed number of input actions;

sequentially and automatically rendering or highlighting at least a portion of the response options of the plurality of response options to the output device in the output format, the sequentially rendering or highlighting comprising:

rendering or highlighting a first response option of the plurality of response options;

waiting a first determined period of time;

receiving a first user input signal in response to the one or more queries through the constrained user input device during the first determined period of time;

comparing an intensity of the first user input signal with a threshold;

determining that the intensity of the first user input signal does not satisfy the threshold;

in response to determining the first user input signal does not satisfy the threshold during the first determined period of time, rendering or highlighting a second response option of the plurality of response options;

waiting a second determined period of time;

receiving a second user input signal in response to the one or more queries through the constrained user input device during the second determined period of time;

comparing an intensity of the second user input signal with the threshold;

determining that the intensity of the second user input signal satisfies the threshold;

in response to determining that the intensity of the second user input signal satisfies the threshold, associating the second user input signal with the second response option, the associating representing a selection of the second response option as a query response; and causing the query response to be stored in association with the one or more queries.

2. The one or more computer-readable storage media of claim 1, the processing further comprising:

training the constrained user input device.

3. The one or more computer-readable storage media of claim 2, wherein training the constrained user input device comprises, for a plurality of response types:

prompting a user to provide input for a response type of the plurality of response types;

receiving user input for the response type, the user input comprising a signal having an intensity;

determining a threshold intensity for the response type; and associating the signal and the threshold intensity with the response type.

4. The one or more computer-readable storage media of claim 1, wherein sequentially and automatically rendering or highlighting the at least a portion of the response options comprises: selectively highlighting discrete response options of concurrently displayed multiple response options of the plurality of response options.

5. The one or more computer-readable storage media of claim 4, wherein selectively highlighting discrete response options of the plurality of discrete response options comprises sequentially presenting each of the plurality of discrete response options in a different visual style for a duration until a discrete response option is selected, wherein user input received during the highlighting selects the highlighted discrete response option as the query response for the response field.

6. The one or more computer-readable storage media of claim 1, wherein sequentially and automatically rendering or highlighting at least a portion of the response options comprises sequentially outputting speech indicating a discrete response option to an audio endpoint.

7. The one or more computer-readable storage media of claim 4, wherein the output device is a display, the constrained user input device is a neural input device, and receiving a user input signal comprises receiving neural input selecting a highlighted discrete response option as the query response.

8. The one or more computer-readable storage media of claim 1, wherein a query of the one or more queries comprises a plurality of response fields and rendering the one or more queries to an output device of the output type comprises rendering a first plurality of response options of the plurality of response options for a first query of the plurality of queries and rendering a second plurality of response options of the plurality of response options for a second query of the plurality of queries after receiving the second user input signal.

9. The one or more computer-readable storage media of claim 1, wherein associating the user input signal with a query response comprises associating data for a selected response option with an identifier of a metadata field of a backend computer system.

10. The one or more computer-readable storage media of claim 1, wherein rendering the one or more queries to an output device of the output type comprises converting the one or more queries to audio signals with a text-to-speech converter.

11. The one or more computer-readable storage media of claim 1, wherein determining an input type for a constrained user input device comprises selecting an interface for the user input device.

12. The one or more computer-readable storage media of claim 1, wherein the at least one response field comprises metadata identifying a domain comprising the plurality of response options.

13. The one or more computer-readable storage media of claim 1, wherein a query of the one or more queries comprises a plurality of domain identifiers, each domain identifier specifying a domain comprising a set of response options.

14. The one or more computer-readable storage media of claim 1, wherein determining an output type comprising selecting an audio renderer or a video renderer.

15. The one or more computer-readable storage media of claim 1, wherein determining an input type for a constrained user input device comprises selecting between audio input, neural input, and gesture input.

16. The one or more computer-readable storage media of claim 1, the processing further comprising:

for a determined constrained user input device, retrieving configuration information for a user.

17. A computing system that implements a transformation platform, the computing system comprising:

a neural input device;

one or more memories;

one or more processing units coupled to the one or more memories and the neural input device; and one or more computer readable storage media storing instructions that, when loaded into the memories, cause the one or more processing units to perform operations for:

implementing an interaction manager, the interaction manager coded to provide a plurality of input type managers, the plurality of input type managers comprising a neural input manager, at least one of the plurality of input type managers comprising one or more device interfaces, the one or more device interfaces of the neural input manager comprising a device interface for the neural input device, the interaction manager further coded to receive user input selecting a response option for one or more queries;

implementing a rendering engine, the rendering engine coded to:

provide at least one of an audio renderer or a video renderer, the audio renderer or video renderer coded to transform one or more queries into a format renderable to an output device; and sequentially and automatically render discrete query response options of a plurality of possible query response options, the rendering comprising rendering a first response option of the plurality of possible query response options, waiting a determined period of time, determining that input selecting the first response option was not received, and rendering a second response option of the plurality of possible query response options in response to determining that input selecting the first response option was not received within the determined period of time;

implementing an interaction manager, the interaction manager coded to associate user input from the neural input device with a most-recently rendered query response option; and a data manger, the data manager coded to send user query responses to a backend computer device and to receive queries from the backend computer device.

18. The computing system of claim 17, wherein the selectively and automatically rendering comprises sequentially highlighting the plurality of response options, the plurality of response options being concurrently displayed.

19. A method, implemented in a computing system comprising a memory and one or more processors, comprising:

receiving a query comprising a plurality of response fields, each of the plurality of response fields comprising a plurality of response options;

rendering the plurality of response options for a first response field of the plurality of response fields for a selected one of a plurality of output types;

selectively and automatically highlighting sequentially the plurality of response options until user input is received selecting a highlighted response option as a query response, wherein a next response of the plurality of response options is highlighted if user input having an intensity satisfying a threshold is not received during a determined time period during which a current response being displayed is highlighted;

receiving user input provided through a constrained user input device comprising a hardware sensor, the user input having an intensity indicating the selection of a highlighted response option;

determining if the query comprises additional response fields;

carrying out the rendering, selectively highlighting, receiving, and determining for a next query response field; and causing the query responses to be stored.

20. The method of claim 19, wherein causing the query responses to be stored comprises:

associating each query response with an identifier of the query response field; and sending the query responses and their associated identifiers to a backend computer device.

* * * * *